United States Patent [19]

Joel, Jr.

[11] 3,906,175

[45] Sept. 16, 1975

[54] MULTIPLE LINK NODAL SWITCHING NETWORK

[75] Inventor: Amos Edward Joel, Jr., South Orange, N.J.

[73] Assignee: Bell Telephone Laboratories, Incorporated, Murray Hill, N.J.

[22] Filed: Mar. 20, 1974

[21] Appl. No.: 452,800

[52] U.S. Cl. ........................ 179/18 GE; 179/18 GF
[51] Int. Cl.² .......................................... H04Q 3/56
[58] Field of Search . 179/18 GF, 18 GE, 22, 18 EA

[56] References Cited

UNITED STATES PATENTS 3,729,593 4/1973 Altenburger et al. .......... 179/18 EA

*Primary Examiner*—Kathleen H. Claffy
*Assistant Examiner*—C. T. Bartz
*Attorney, Agent, or Firm*—H. R. Popper

[57] ABSTRACT

A multilink nodal switching network is disclosed which permits heavy traffic among a plurality of equi-interconnectible switching nodes. Circuitry for busy-testing, for marking idle links and for steering crosspoint operating potential to a selected idle link in a designated direction is shown. The multilink nodal network is a higher traffic carrying version of the single link nodal switching network of my prior patent application Ser. No. 393,595 filed Aug. 31, 1973. A link marking potential is applied at the given node to which the connection has reached, a next node in the direction of the called node is ascertained and a group of its links lying in the direction of the given node are busy tested. A crosspoint operating potential is steered to a first idle one of the tested links at the next node and, in cooperation with the marking potential, operates a crosspoint at the given node. After the crosspoint operates at the given node the link marking potential replaces the crosspoint operating potential at the next node.

12 Claims, 6 Drawing Figures

MULTIPLE LINK NODAL SWITCHING NETWORK

BACKGROUND OF THE INVENTION

This invention relates to switching networks and more particularly to networks in which extension of a connection path from one termination or node in the network to another is controlled by a central or common control apparatus. It is an object of the present invention to provide a nodal switching network which exhibits higher traffic carrying capacity than that of my copending patent application entitled "Nodal Switching Network Arrangement and Control," Ser. No. 393,595 filed Aug. 31, 1973.

In my above-mentioned copending application, I disclosed an arrangement featuring an equi-interconnectible array of switching points arranged in a convoluted plane that offers several advantages over conventional network arrangements. Among these are the avoidance of the need continually to reassign network terminations to maintain traffic balance and the ability linearly to expand the size of the network without a great deal of interswitching point rewiring.

In my prior arrangement each switching node was connected to its neighbor node by a single link. In the simple plan there disclosed, each switching node was surrounded by four neighbor nodes, a node to the left, to the right, above and below the given node. A uniform system of link designation was employed so that at any node the link to the right was designated L1, the link to the node below was designated L2, the link to the node to the left was designated L3 and the link to the node above was designated L4.

In my prior system once a connection had been extended from a given node to a "next" node, at its right for example, (via the L1 link at the given node and the L3 link in the "next" node), no further connections could be directly made between these nodes and resort to an alternative or to a regressive path involving additional and intervening nodes was required. The circuitry by means of which the "busyness" of nodes is mapped and by means of which links to a next node and links outgoing from the next node in the direction of the ultimate destination are tested resulting in the selection of the "next" node in the switching path is fully disclosed in my earlier application. This circuitry is somewhat complex and it was thought to be desirable to be able to reutilize this node selection control circuitry in a heavier traffic carrying capacity version of a nodal network such as one in which a number of such L1-L3 links instead of only a single L1-L3 link would be provided.

Accordingly, it is an object of the present invention to provide a circuit by means of which multilink nodal switching centers may be interconnected without having to modify basic path selection strategy circuits of my prior nodal switching system.

SUMMARY OF THE INVENTION

I have discovered that an increased number of crosspoints at switching nodes and the additional link paths between nodal switching nodes which are required to provide a heavier traffic-carrying version of the nodal switching network which is the subject of my copending application, Ser. No. 393,595, may be configured so as to enable them to be properly controlled by the same path-selection circuitry as is shown in my prior application. It is an aspect of my present invention that FIGS. 5 and 6 and FIGS. 8 through 12 of my above-mentioned copending application shall operate in connection with FIGS. 1 through 4 of the present arrangement in substantially identical manner to which that prior circuitry functioned in cooperation with FIGS. 7 and 7A of my prior case.

In the present embodiment, a number of parallel link paths are provided between adjacent switching nodes. Control circuitry is included to inform the path-selection circuitry of my above-mentioned copending application when all of the paths in a particular direction are busy during states $\phi 2$ and $\phi 3$ of the process control state sequence generator of FIG. 5 thereof. During those states, it will be recalled, the links to adjacent nodes II and III are tested. In the operation of my prior case, the link testing operation resulted, during state $\phi 5$, in the selection of the "next" node (either node II or III), in the designation of the link direction, and in the direct application to the single sleeve lead of the selected link direction of a heavy negative potential so that the appropriate node I crosspoint would be operative. In the present circumstance, however, there are a plurality of links in the direction of the given node I. My new circuit steers the negative potential on a selective basis to a first idle link in the appropriate direction and excludes any links which are already busy from receiving the heavy negative potential. After the crosspoint at node I (the node to which the connection lead progressed) is operated, the circuitry of my present invention reverses the polarity of the potential applied to the selected link so that the node associated with it may now become the "given" node incident to the further extension of the switching path.

DESCRIPTION OF THE DRAWING

Further and other aspects of my present invention may become more apparent by referring to the drawing in which:

FIGS. 1–4 are to be arranged; and

GENERAL DESCRIPTION AND OVERVIEW

Figure 6:
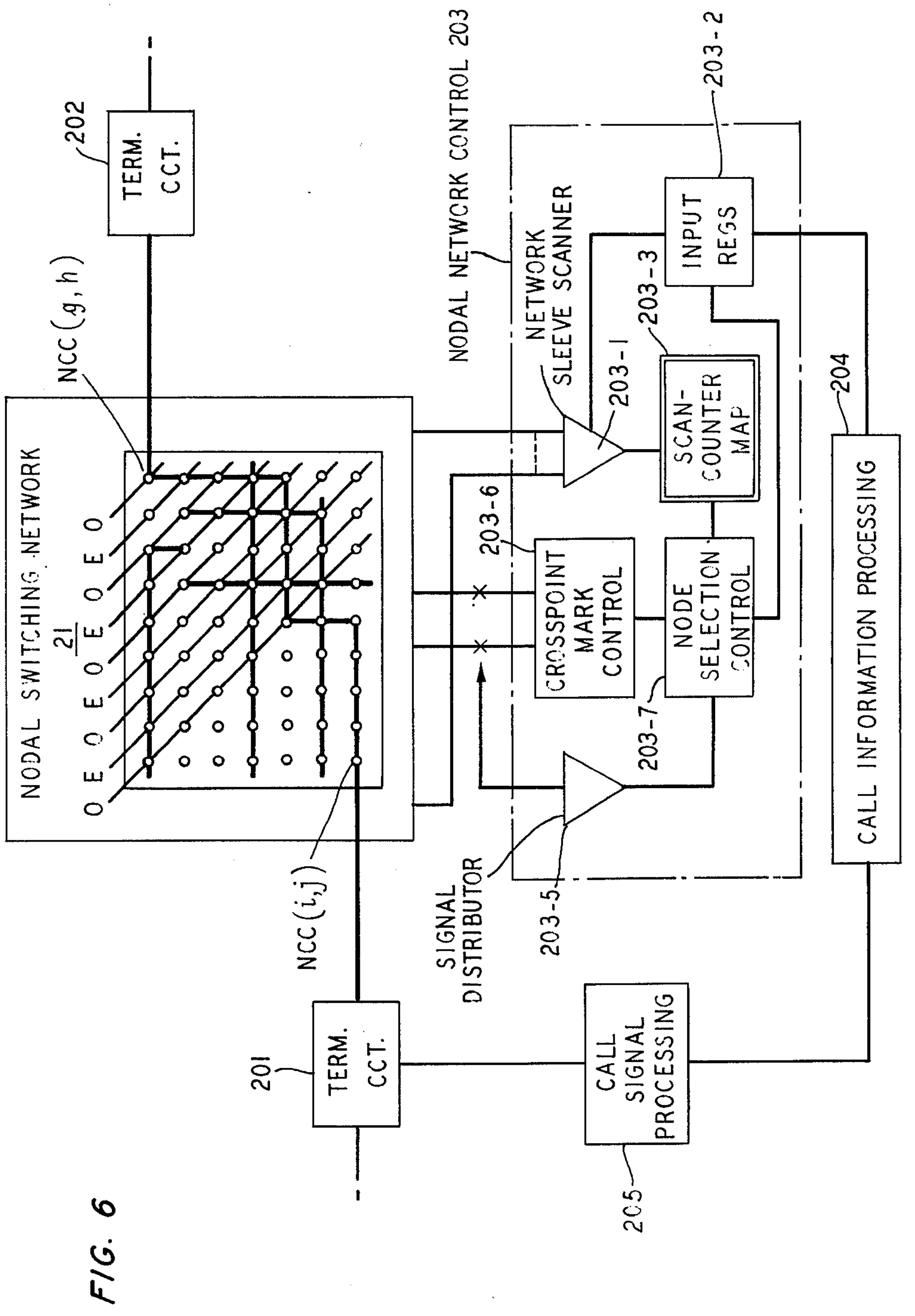
FIG. 6 shows an overall block diagram of a nodal switching network and control therefor.

A brief review of the nodal switching network concept introduced in my prior copending application Ser. No. 393,595 will be facilitated by a consideration of FIG. 6 which was FIG. 2 of the copending application. A nodal switching network 21 is a network made up of nodal crosspoint configurations (NCCs). Each NCC is a wire center or at least a switching entity at which calls may originate, terminate or may be switched-through. Calls may originate or terminate at the associated termination circuit of a node. For simplicity in nodal switching network 21 only the node NCC(i,j) and the node NCC(g,h) are shown equipped with terminating circuits 201 and 202, respectively. The nodal network 21, as was explained in my copending application, offers a great variety of possible paths of different lengths that can be constructed between a calling node and a called node. The control mechanism for constructing these paths is contained in the nodal network control 203 which is described in detail in the copending application. Initially, the control mechanism attempts to select one of the possible minimum length paths between the calling and called terminations and, if this is not possible, an attempt is made to establish a non-minimum length path.

Nodal network control 203 is comprised of six principal parts. Electronic scanner 203-1 is a prior art device for scanning lines or trunks. It is connected to monitor the sleeve leads of the links between the nodes of network 21 so that when the address of a node is entered into input registers 203-2 from the call information processing system 204, the scanner 203-1 will enter the busy/idle state of the links associated with the node into scan counter memory map 203-3.

As was described in copending Ser. No. 393,595, scanner 203-1 is used in a somewhat different manner and to achieve rather different ends than scanners in prior art switching systems. Thus, for example, scanner 203-1 of my prior system ascertained which links at a particular node were busy and, in addition, entered into scan counter memory map 203-3 counts of the cumulative total of busy links present at the nodes in predetermined rows and columns of nodes in network 21. This function of maintaining a count of the "busyness" of predetermined nodes and, more particularly, of predetermined nodes lying between the coordinates of the calling and called node was a unique feature of the system described in Ser. No. 393,595.

In addition to scanner 203-1, nodal network control 203 includes a signal distributor 203-5 which operates a node connection relay 41 for every NCC in network 21, a node selection control circuit 203-7 and a crosspoint mark control circuit 203-6. Contacts of two of these relays 41 will be shown in detail in FIGS. 1 and 2 herein.

The node selection control circuit 203-7 contains logic circuitry for enabling a path to be selected through network 21 between a called and calling termination circuit. Circuit 203-7 examines the scan counter map 203-3 and based on the link busy/idle conditions, ascertained when the node connection relays are operated, employs its internal selection logic circuitry to determine which crosspoints in network 21 are to be operated. The details of node selection control circuitry are shown in FIGS. 5 and 6 and 8 through 12 of Ser. No. 393,595.

The remaining major circuit element of nodal network control 203 is crosspoint mark control circuit 203-6. In my prior arrangement, crosspoint mark control 203-6 obtained access via a respective connecting relay 41 to the sleeve leads of each intermediate NCC as that NCC was considered a possible "next node" by the node selection control circuit 203-7. Circuit 203-6 applied sequences of positive and negative potentials to the sleeve leads of selected links to extend the connection to the next node by operating the crosspoint in the preceding, first, or key node as the case might be. The crosspoint mark control circuit of my prior arrangement, however, was only capable of functioning with nodes equipped with but a single link to any neighbor node. In my present embodiment, I have discovered how the nodal network control 203 of my prior arrangement may be adapted to serve a nodal switching network 21 in which each node may be connected to each neighbor node by a multiplicity of *m* links merely by making certain changes in crosspoint mark control circuit 203-6. These changes will now be described in the ensuing detailed description. For a description of the nodal switching array itself and the remainder of the circuitry which is not necessary to be included herein, reference should be made to my above-mentioned copending application the disclosure of which application, is herewith incorporated by reference.

DETAILED DESCRIPTION

Figure 1:
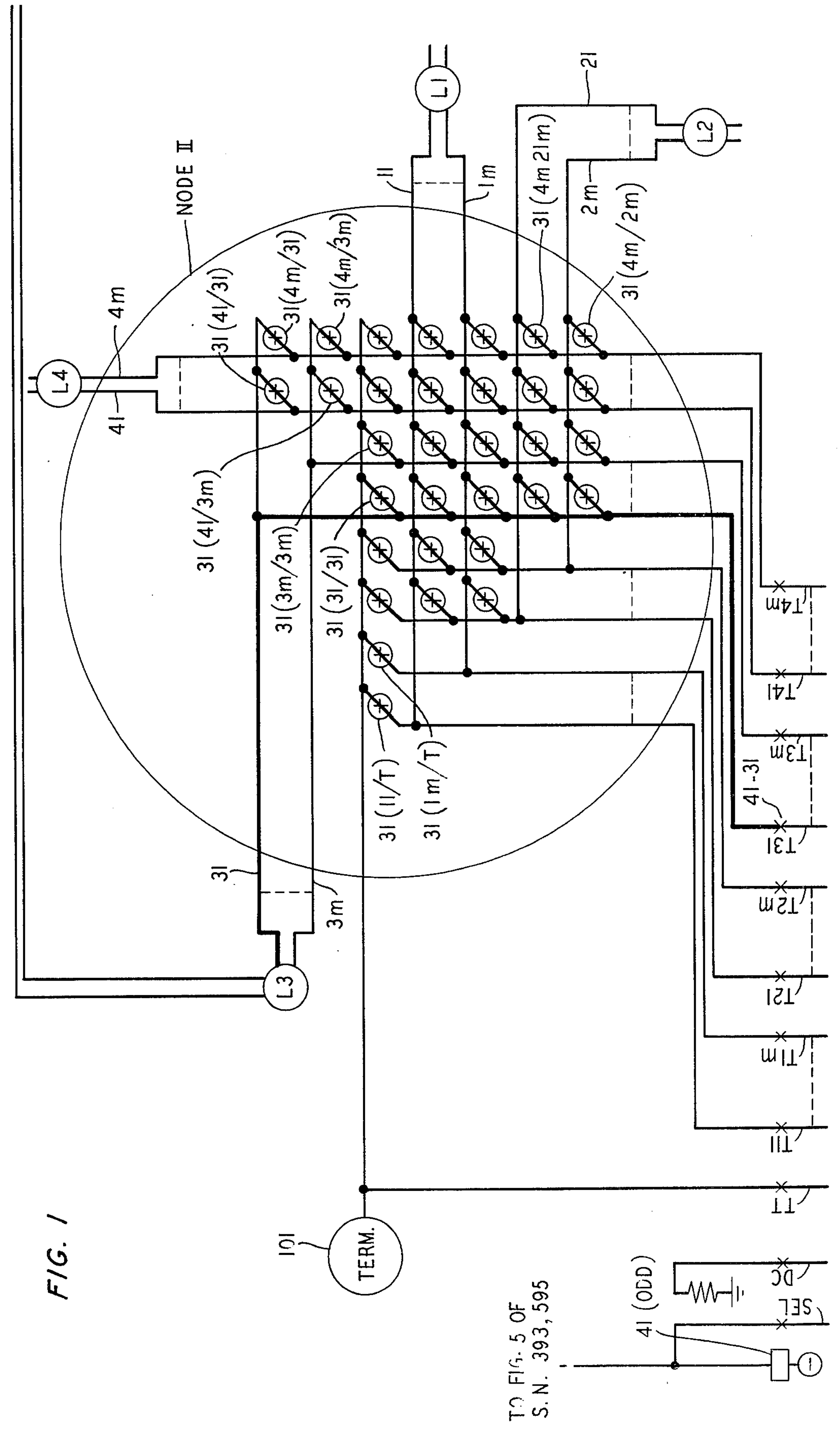
FIGS. 1 and 2 show the additional crosspoints with which illustrative switching nodes I and II are equipped to provide increased traffic-handling capacity.
Figure 2:
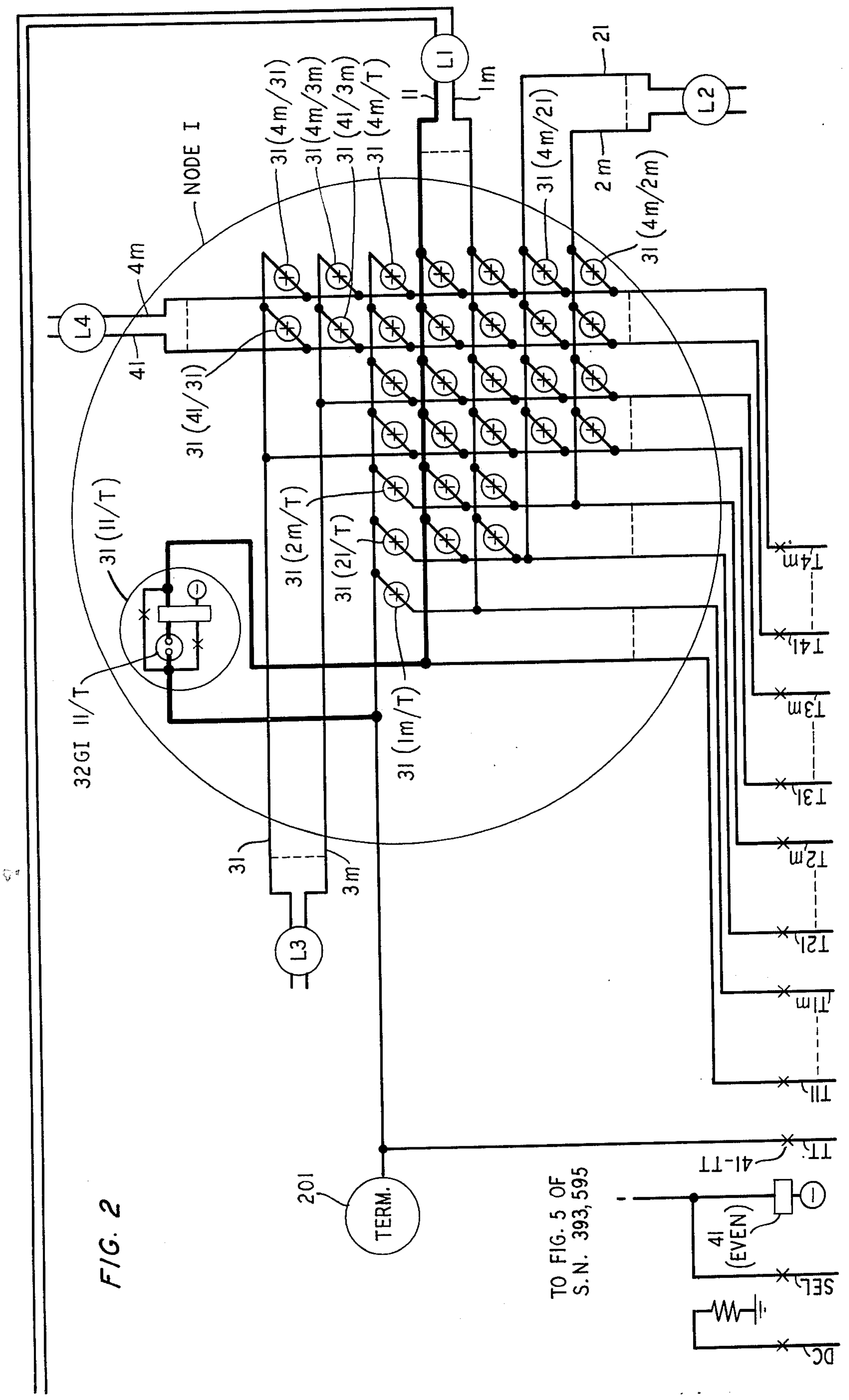

Referring now to FIGS. 1 and 2, there are shown two switching nodes designated as node I in FIG. 2 and as node II in FIG. 1. The nodes are similar to, but have greater traffic carrying capacity than switching nodes I and II shown in FIG. 7A of my above-mentioned copending patent application. As was the case before, it will be assumed that node I is the originating node and, as before, only the sleeve circuitry for one crosspoint will be shown in detail and all tip and ring crosspoints are omitted from the drawing.

Because of the great number of crosspoints, an additional simplification has been introduced in that only the first and last crosspoint for each link is indicated. Thus the sleeve path of crosspoint 31(11/T) is shown in full detail, FIG. 2, and this is the first of the *m* crosspoints available to connect terminating circuit 201 to link group L. Crosspoint **31(1*m*/T)** is the last of the *m* crosspoints available to connect terminating circuit 201 to link group L1 and, like the remainder of the crosspoints in the figure, is indicated by the simplified schematic symbol of an "X" inscribed within a circle. Likewise, crosspoint 31(21/T) is the first of the *m* crosspoint available to connect terminating circuit 201 to link group L2 while crosspoint **31(2*m*/T)** is the last of the *m* crosspoints available to connect terminating circuit 201 to link group L2. In all, **4*m* crosspoints are available to be used in extending sleeve paths from terminating circuit 201 to link group L1 through L4 in node I but only 8** of these are actually physically represented in the drawing.

In the ensuing description of the detailed operation of FIGS. 3 and 4, a connection will be described that will extend from terminating circuit 201 and outgoing link group L1 of node I of FIG. 2 to incoming link group L3 of node II of FIG. 1. Illustrative ones of the first and last of the crosspoints available to connect incoming link group L3 of node II with that node's link group L1, L2, L4 or its terminating circuit 101, have been individually labelled. Thus, crosspoint 31(41/31) of node II is the first and crosspoint **31(4*m*/3*m*)** is the last of the up to $m^2$ crosspoints available for associating the *m* conductors of incoming link group L3 of node II with the *m* conductors of that node's outgoing L4 link group. Likewise, crosspoint 31(31/31) is the first and crosspoint **31(3*m*/3*m*)** is the last of the link group L3 set of *m* crosspoints available to connect link group L3 to node II's terminating circuit 101.

As was the case in my above-mentioned copending application, each switching node such as node II of FIG. 1 and node I of FIG. 2 is connectible to the crosspoint mark control circuitry (shown here in FIGS. 3 and 4) over contacts of a respective, crosspoint connecting relay 41 (EVEN) or 41(ODD) depending upon whether the switching node is on an even- or an odd-numbered diagonal of the nodal switching array.

Figures 4, 5:
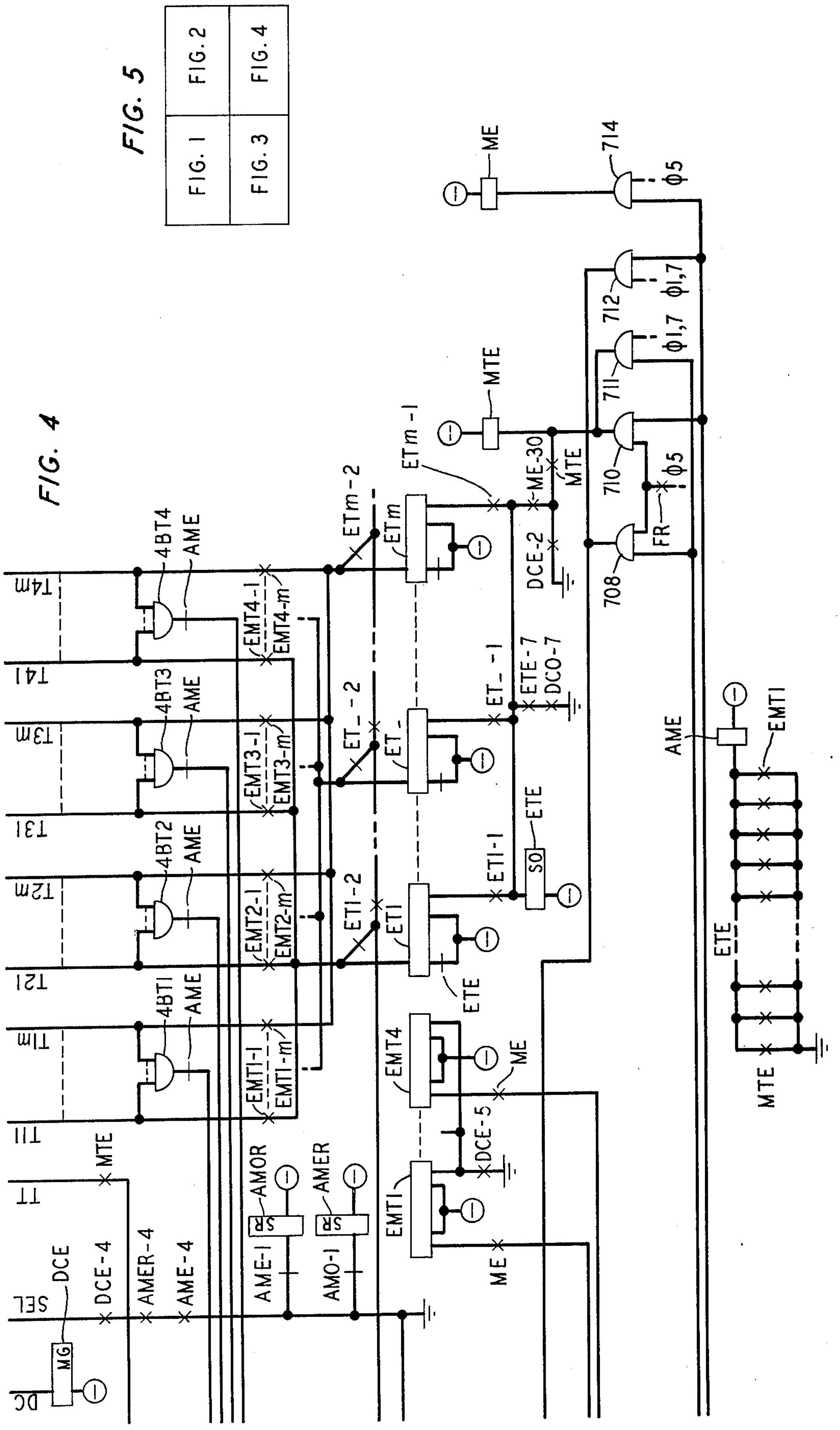
FIG. 5 shows how

It will be recalled that the respective crosspoint connecting relay 41- is operated by the circuitry shown in FIG. 5 of Ser. No. 393,595 and that during state $\phi 1$ relay 41 of node I of FIG. 7A of my prior system was (and of node I of FIG. 2 of the present system is) locked operated to lead SEL. When relay 41(EVEN) in FIG. 2 operates, one of its make contacts applies resistance ground to lead DC causing relay DCE in FIG. 4 to operate. During states $\phi 2$ and $\phi 3$, relay DCO in FIG. 3 is temporarily operated when nodes II and III (see Ser. No. 393,595) are tested. A certain similarity will be seen to exist between FIGS. 3 and 4 of the present application and FIG. 7 of Ser. No. 393,595. For ease of comparison and understanding of the operation of FIGS. 3 and 4 of my present invention, similar reference designations are employed as were employed in FIG. 7 of Ser. No. 393,595. Thus, flip-flop 701 shown in FIG. 3 is identical to flip-flop 701 of FIG. 7 of my prior disclosure. The temporary operation of delay DCO just described does not, however, cause flip-flop 701 to be reset since the continued operation of back contact DCE-3 interrupts the resetting ground path.

With flip-flop 701 remaining set at the beginning of state $\phi 5$, gate 706 is enabled thereby operating relay MO. During state $\phi 5$ either node II or node III (not shown herein but shown in Ser. No. 393,595) may be selected and its node connecting relay 41 (ODD), FIG. 1, will be operated. Since nodes II and III are on an odd diagonal, relay MO is operated during state $\phi 5$. The operation of relay MO at its make contacts MO-1 through MO-4 in the lower left-hand corner of FIG. 3 extends the output of gates 702 through 705 to the left-hand windings of relays OMT1 through OMT4, respectively.

It will be recalled that the Table II circuitry of FIG. 11 of Ser. No. 393,595 registers the fact that a path from calling node I to next node II must employ link group L3 of node II. In the prior arrangement, it was a rather simple matter for the circuitry of FIG. 11 to detect when link group L3 of node II was busy since only one link was involved. In my present embodiment, however, L3 is a group of *m* links. To detect the all-busy condition, I provide an AND gate 3BT3 which has an input corresponding to each of leads T31 through T3*m*. If all of the *m* links of node II's link group L3 are busy, gate 3BT3 applies a ground signal to lead T3 toward the Table II circuitry of Ser. No. 393,595 to indicate that node II cannot be selected as the next node. In this manner the Table II circuitry is not "aware" of the fact that it is serving the much heavier traffic embodiment of my present invention.

Figure 3:
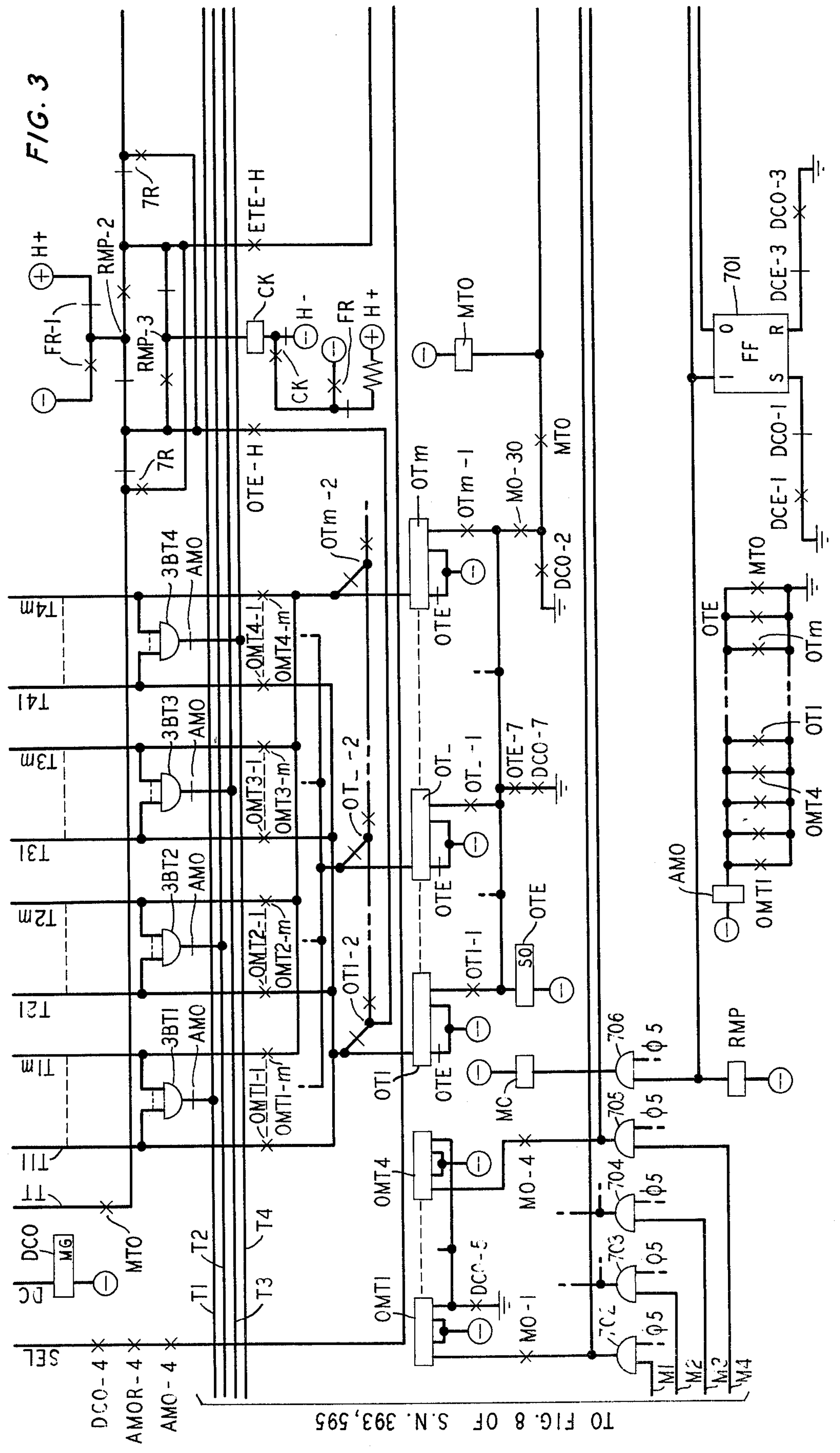
FIGS. 3 and 4 show the link busy testing and crosspoint operating potential steering circuitry for controling the operation of the switching nodes.

Assuming, however, that lead T3 does not report an all-links-busy condition to the circuitry of FIG. 8, that circuitry may select node II and will energize its lead M3 which enters the circuitry of FIG. 3 of the present embodiment at its lower left-hand portion. In my prior arrangement, the energization of lead M3 during state $\phi 5$ directly operated one of the series of relays M10 through M40 of FIG. 7 of that application. Contacts of the operated relay functioned to supply a heavy negative potential over the single incoming L3 link of node II which was extended to the single outgoing L1 link of node I thereby to operate a single L1 crosspoint in node I. In the present case, however, there are at least *m* crosspoints in node I available to be operated and it is important to be able to steer the heavy negative potential to a particular idle crosspoint of the link group.

It will be recalled from Ser. No. 393,595 that the selection of node II as the "next node" is made by the strategy circuit of FIG. 8 energizing lead M3 of leads M1 to M4 and that leads M1-M4 activate gates 702–705, respectively. The double winding relays OMT1 through OMT4 which are connected to gates 702–705 have replaced relays M10 through M40 of FIG. 7 of my prior application and the new relays perform additional functions. The operated one of these relays locks over its right-hand winding to the ground provided over contact DCO-5.

Let it be assumed that relay OMT3 operated corresponding to the selection of lead M3 by the strategy circuit of FIG. 8 of Ser. No. 393,595. (The circuit of FIG. 8 selects lead M3 when it recognizes that the path from node I to node II must, under Table II conditions A or B, employ link group L3 of node II.) At this time signal distributor 526 of FIG. 5 of Ser. No. 393,595 operates node II's connecting relay 41(ODD) and relay DCO in FIG. 1 hereof is caused to operate.

When relay OMT3 is operated, its make contacts OMT3-1 through OMT3-m connect each of leads T31 through T3m to a corresponding one of the left-hand windings of busy test relay OT1 through OTm, respectively. Individual ones of relays OT1 through OTm are operated by the appearance of a busy potential on the respective ones of lead T31 through T3m. Thus, if one or more links of the selected link group L3 are busy, corresponding ones of relays OT1 through OTm are operated. The operated OT1 through OTm relays lock to ground over their respective right-hand windings and contacts MO-30 and DCO-2. Relay MO operates at the beginning of state $\phi 5$ by the set output of F/F 701 and gate 706. Accordingly, upon the operation of relays MO and DCO, an operating path is provided from ground and make contacts DCO-2 and MO-30 to the winding of slow operate relay OTE.

Relay OTE is slow enough in operating to allow sufficient time for the relays OT1 through OTm (which have been associated with busy links of link group L3 by the operation of relay OMT3) to operate. The same path used to operate relay OTE is also used to lock relays OT1 through OTm over their right-hand windings in series with their make contacts OT1-1 through OTm-1, respectively. Accordingly, the OT-relays corresponding to busy links in link group L3 are lock operated at their steering contacts.

When relay OTE operates, its contact OTE-H forwards to the steering contact array OT1-2, . . .OT--2. . . . , OTm-2 a heavy negative battery potential that originates at the back contact and winding of relay CK. Let it be assumed that conductor T31 is the first encountered conductor to exhibit the idle condition. Its associated relay OT1 will be in the released condition. The heavy negative potential is forwarded over the back contact of transfer contacts OT1-2, operated make contacts OMT3-1 to conductor T31 and over the associated make contact 41-31 of node connecting relay 41(ODD) and link sleeve lead 31 of link group L3 of node II to link 11 of link group L1 of node I, FIG. 2.

If it had happened that conductor T21 of the L3 lins was in use on a call, the busy potential appearing on this conductor will operate relay OT1 and, accordingly, the make contact of steering contact OT1-2 will forward the heavy negative potential made available on contact OTE-H to the next available set of OT- relay steering contacts. If this set of steering contacts is operated, the heavy negative potential will be forwarded by its operated make contacts until it is forwarded over the first-encountered released back contact of a set of QT--2 steering contacts associated with an idle link of link group L3.

It will be recalled that in my prior embodiment during state $\phi5$, a positive potential H+ was applied by the right-hand circuitry of FIG. 7 to a particular gas tube of node I. A somewhat similar condition is provided by the circuitry of FIG. 4 of the present embodiment except that the positive potential H+ is applied to one side of each of the four sets of *m* crosspoint gas tube that are available to connect terminating circuit 201 to node I's outgoing link groups L1, L2, L3 and L4.

Of course, in the present case, it is desired that only one of the *m* outgoing links of link group L1 of node I be involved in the connection as it is node I's outgoing link group L1 that is associated on a direct, individual-link-for-individual-link basis with node II's incoming link group L3. Of the 4*m* crosspoints available to connect terminating circuit 201 with node I's links L1 through L4 only the *m* crosspoints of link group L1 have the possibility of having heavy negative potential being applied thereto by the links of node II's link group L3. Of these *m* links only node II's link 31, as previously described, has the heavy negative potential actually applied thereto. This heavy negative potential on node II's link 31 appears on node I's link 11 at the right-hand side of crosspoint gas tube 32GI11/T. The left-hand side of gas tube 32GI11/T has heavy positive potential applied thereto which potential may be traced over a path beginning in FIG. 3 and extending from source H+ to the make contact of transfer contacts RMP-2, back contact 7R, to make contact MTE, of FIG. 4 and thence over contact 41-TT of node connecting relay 41(EVEN) to the left-hand electrode of tube 32GI11/T. The break-down of tube 32GI11/T under the combined sum of the h+ and H- potentials operates crosspoint relay 31(11/T) which locks to heavy positive potential applied to node I's lead TT. Relay CK, FIG. 3, operates in the crosspoint breakdown path and removes the H− potential from lead T31 of node II and replaces it with resistance H+ potential. Crosspoint relay 31(11/T) remains locked to the resistance ground provided by the calling node's terminating circuit 201 (see FIG. 4B of Ser. No. 393,595).

It will be recalled that when relay OMT3 is operated incident to the marking of lead M3, one of its make contacts at the right-hand side of FIG. 3 completes an operating path for relay AMO. Relay AMO operates and, at its back contact AMO-1 in FIG. 4 opens the operating path for slow release relay AMER which relay was operated during state $\phi1$. Relay AMER is show enough in releasing to permit the crosspoint 31(11/T) and relay CK to operate, as just described. When relay AMER does release, its released make contact AMER-4 in FIG. 4 removes the holding ground applied to lead SEL and the node connecting relay 41(EVEN) in FIG. 2 for node I is released.

With the release of the node connecting relay for node I, relay DCE in FIG. 4 is released and its back contact DCE-3 in FIG. 3 completes a ground path to reset flip-flop 701. The resetting of flip-flop 701 releases relay RMP. The releaese of relay RMP removes the resistance H+ potential which had been applied over the make contact of transfer contacts RMP-3 and contacts OTE-H to conductor T31 of node II. However, heavy positive potential H+ is substituted over the released back contact of transfer contacts OMT3-1 to conductor T31 of node II. The H+ potential remains on lead T31 of node II after the end of the state $\phi5$ since relay OMT3 has locked over its right-hand winding and contact DCO-5 and relay OTE remain locked over contacts OTE-7 and DCO-7.

Accordingly, at the end of phase 5 of the frame of phases that have just been described, a connection has been established that extends from terminating circuit 201 over node I's outgoing link 11 to node II's incoming link 31 and incident to the release of the node connecting relay for originating node I relay CK is released. As described in the above-mentioned copending application, the restored back contact CK-5 in FIG. 5 of that application, now permits the process control state sequence generator 525 to advance generally to state $\phi6$. During state $\phi6$ the flip-flops and registers II and III of FIGS. 12 and 1C, thereof are reset. The process control state sequence generator 525 of the above-mentioned application begins another frame of states $\phi2$ through $\phi6$ in which link testing, scan-counter comparisons, and link selections take place progressively to advance the connection to a next node.

The next "next node" to which the connection will be extended must lie on an even diagonal since node II of FIG. 1 was assumed to lie on an odd diagonal. On this selection of the next node after node II, a node connection relay 41 for an even numbered node will be selected that is similar to relay 41(EVEN) of FIG. 2. The test leads of this next even-numbered node, T11 through T1m, T21 through T2m, T31 through T3m, T41 through T4m will be extended to the circuitry of FIG. 4. Relay DCE will operate. The circuitry of FIG. 4 will now perform for the even-numbered node, during phase $\phi5$ of the ensuing frame, operations similar to that performed by the circuitry of FIG. 3 when odd-node II was selected except that this time it is the circuitry of FIG. 4 which applies the heavy negative potential to the selected link of the "next node" instead of the circuitry of FIG. 3.

Thus, when the circuitry of FIG. 8 of Ser. No. 393,595 energizes one of leads M1 through M4 during state $\phi5$ of that ensuing frame one of relays EMT1 through EMT4 in FIG. 4 will be operated to cut-through a group of *m* leads to the busy testing relay ET1 through ETm. Relay ME will be operated by gate 714 and the reset state of flip-flop 701. After any of relays ET1 through ETm associated with busy links have operated and locked, slow operate relay ETE will operate. A heavy negative potential will then be applied over a path beginning in FIG. 3 and extending over back contact and relay winding CK, the released back contact of transfer contacts RMP-3 and make contacts ETE-H to FIG. 4 and the steering contacts of relays ET1 through ETm to the selected idle link of the link group corresponding to the one of relays EMT1 through EMT4 operated by the energized one of leads M1-M4 of FIG. 3.

Accordingly, I have shown an improved nodal switching network and control therefor offering m links between each node and its neighbor node for an increased traffic handling capacity over that available in my copending Ser. No. 393,595. In my present embodment, before the heavy negative marking potential can be applied to the link incoming from the first or key node all busy links in the incoming link group are excluded by the circuitry comprising the steering contacts of relays OT1 through OTm. In addition, the situation when the entire incoming link group is busy is detected by the associated one of AND gates 3BT1 through 3BT4. For example, in the foregoing detailed description, it was assumed that node II was the "next node" because gate 3BT3 did not ground lead T3 to the strategy circuitry of FIG. 8 of Ser. No. 393,595. Under certain traffic conditions node III might have all of its incoming links of link group L3 busy in which case lead T3 would be grounded by gate 3BT3 and accordingly the circuitry of FIG. 8 of Ser. No. 393,595 would select a different node such as node III (not shown herein but shown in Ser. No. 393,595). Under these circumstances, the operation of the circuitry of FIGS. 3 and 4 would be similar to that hereinbefore described with the exception that the circuitry of FIG. 8 of Ser. No. 393,595 would energize lead M2 as the Table I circuitry of Ser. No. 393,595 shows that node III is accessed from node I via node III's incoming link group L2.

Further and other modifications will be apparent to those skilled in the art without, however, departing from the spirit and scope of my invention.

What is claimed is:

1. In a nodal switching system having a plurality of switching nodes, a group of links interconnecting each node with a respective one of a plurality of neighbor nodes, and means for designating an appropriate link group to extend a connection from a given node to a next one of said neighbor nodes, the combination comprising

- means responsive to said link group designating means for selecting an idle link in a designated link group appearing at said next one of said neighbor nodes,
- means for applying a particular polarity marking potential to said idle link, and
- means at said given node for applying an opposite polarity marking potential to at least one of the links in a link group appearing thereat corresponding to the link group designated by said designating means.

2. A nodal switching system according to claim 1 wherein said opposite polarity potential applying means comprises means for marking the link in the link group over which the connection had been extended to said given node.

3. A nodal switching system having a plurality of switching nodes, a network of links for interconnecting each node with a plurality of neighbor nodes, and means for designating an appropriate link to extend a network connection from a given node to a next one of said neighbor nodes, characterized in that the links for interconnecting each node with its neighbor nodes includes a link group for connecting each node with a respective one of its neighbor nodes and in that said means for designating an appropriate link includes means for testing the links in a particular link group and for applying a marking potential to a selected idle link in said group.

4. A nodal switching system according to claim 3 wherein said testing means comprises means for testing said particular link group appearing at said next one of said neighbor nodes.

5. A nodal switching system according to claim 3 wherein said marking potential is opposite in polarity to the potential applied to the link of the node which precedes said given node in the establishment of a connection extending toward said given node.

6. A nodal switching system according to claim 3 wherein said designating means includes means for changing said marking potential incident to the extension of said connection from said given node to a subsequent node.

7. A circuit connectible to two switching nodes of a nodal switching network, comprising

- means for testing the links of a designated link group at one of said nodes,
- steering means controlled by said testing means for applying a particular polarity potential to an idle link of said group,
- means for applying an opposite polarity potential to a link of a group at the release of said other of said nodes, and
- means responsive to the release of said other of said nodes from said circuit for reversing the polarity of said particular potential applied to said link of said one of said nodes.

8. A circuit according to claim 7 wherein said testing means includes means for indicating when all of the links of a designated link group are busy to inhibit operation of said steering means.

9. A nodal switching system having a plurality of switching nodes, a network of links for interconnecting each node with a plurality of neighbor nodes and recurrently operable means for designating the appropriate link to extend a network connection from node to node characterized in that the links for interconnecting each node with its neighbor includes a link group for connecting each node with a respective one of its neighbor nodes; in that said means for designating an appropriate link includes means for applying a particular polarity marking potential to a selected idle link in a particular link group during one operation thereof and for reversing said polarity incident to the next successive operation thereon.

10. A nodal switching system as in claim 9 wherein said designating means includes a circuit interconnectible to two of said switching nodes having first means for applying to a given node a potential opposite in polarity to said particular polarity and second means for applying said particular polarity potential to said selected idle link in said link group appearing at said next node.

11. In a switching system having a network of switching nodes each having a plurality of links and crosspoints operable to connect said node to any of a predetermined number of surrounding switching nodes, and a central network control for ascertaining which one of the surrounding switching nodes shall be included in an extension of a switching path for a given switching node, the combination comprising

- means connectible to a node to which said switching path has been extended for maintaining a link marking potential at a particular link thereof,
- means for testing the plurality of links at the ascertained one of said switching nodes which links lie in the direction of said node to which said path has been extended, and
- means for steering an opposite polarity link marking potential to a first idle one of said links tested by said testing means to operate a crosspoint at said node to which said switching path has been extended.

12. A nodal switching system comprising a plurality of switching nodes, a plurality of groups of links for connecting each node with respective ones of its neighboring nodes, means for designating a particular link group of a given node of said plurality of switching nodes for connection to a respective link group of one of its neighboring nodes, and means responsive to said link group designating means for selecting idle links in said particular link group for extending a connection between neighboring nodes.

* * * * *